United States Patent [19]

Hall et al.

[11] Patent Number: 4,742,336

[45] Date of Patent: May 3, 1988

[54] PORTABLE INTRUSION DETECTION WARNING SYSTEM

[75] Inventors: W. Lawrence Hall, Bangor; George A. Nash, Plymouth; Harry W. Bailey, Belfast, all of Me.

[73] Assignee: Hall Security Services, Inc., Brewer, Me.

[21] Appl. No.: 937,970

[22] Filed: Dec. 4, 1986

[51] Int. Cl.[4] .......... G08B 1/08; H04M 11/04

[52] U.S. Cl. .......... 340/539; 340/531; 340/546; 340/693; 379/40; 379/44

[58] Field of Search .......... 340/539, 546, 531, 506, 340/691, 693; 379/40, 51, 39, 41, 42, 44

[56] References Cited

U.S. PATENT DOCUMENTS

| | | | |
|---|---|---|---|
| 3,551,906 | 12/1970 | Cooper | 340/539 |
| 3,925,763 | 12/1975 | Wadhwani et al. | 340/539 |
| 4,092,643 | 5/1978 | Stolarczyk | 340/539 |
| 4,319,228 | 3/1982 | Daniels | 340/546 |
| 4,398,184 | 8/1983 | Scott et al. | 340/541 |
| 4,465,904 | 8/1984 | Gottsegen et al. | 340/518 |
| 4,591,935 | 5/1986 | Sharp | 340/539 |
| 4,641,127 | 2/1987 | Hogan et al. | 340/539 |
| 4,661,804 | 4/1987 | Abel | 340/539 |

*Primary Examiner*—Donnie L. Crosland
*Attorney, Agent, or Firm*—Daniel H. Kane, Jr.

[57] ABSTRACT

A portable intrusion detection, monitoring and alarm system is housed in a portable carrying case in the configuration of a briefcase with handle for convenient portability and inconspicuous placement at a desired location near a space to be monitored. Intrusion detectors are removed from the carrying case and placed in the space to be monitored. The intrusion detectors may include infrared motion sensors and radio transmitters for transmitting detection signals to a radio receiver in the carrying case. An electronic controller receives the detection signals from the radio receiver and delivers actuating data signals to a digital communicator and digital dialer with a telephone line output. The digital communicator captures a telephone line with dialing signals and sends further coded signals corresponding to different monitored spaces and intrusion detectors from which detection signals are received. The electronic controller includes an arming circuit and key switch for arming and disarming the monitoring and warning system. The external power supply plug, telephone jack and key switch are mounted on the carrying case so that the components are operable from outside the carrying case with the intrusion detectors in place and the briefcase configuration carrying case closed and locked. Internal battery standby power supply is also provided.

12 Claims, 3 Drawing Sheets

PORTABLE INTRUSION DETECTION WARNING SYSTEM

TECHNICAL FIELD

This invention relates to portable or self-contained intrusion surveillance and alarm systems. Such portable systems typically sense heat or motion in a monitored space and provide a warning or alarm. The present invention provides a new portable alarm system that provides a silent warning over the telephone lines while being housed in an inconspicuous briefcase enclosure.

BACKGROUND ART

A variety of portable or self-contained intrusion surveillance and alarm systems are described in the patent literature. Typically, the alarm device is contained in a portable housing or container for detecting an intrusion into the monitored space and sounding an audible alarm for example as set forth in the Full U.S. Pat. No. 4,151,520 and the Lamb U.S. Pat. No. 4,258,359. The Mason et al. U.S. Pat. No. 4,091,371 also provides for FM transmission of an alarm signal to a receiver remote from the portable container.

The Daniels U.S. Pat. No. 4,319,228 describes a portable intrusion alarm system housed in a carrying container or box. Intrusion into the monitored space is sensed by motion detectors 18 and 20 and a magnetic door switch 22. The portable unit includes both AC operated detectors and battery operated detectors. The alarm devices include horns 14 and lights 16. Another compact alarm system using a piezo electric detector element for sounding an audible alarm is described in the Schwarz et al. U.S. Pat. No. 4,253,095. A portable surveillance unit to operate a local camera or alarm siren is described in the Taillens et al. U.S. Pat. No. 4,540,977.

The details of a variety of infrared and radio security detectors are described in several patents including the Akiyama et al. U.S. Pat. No. 4,551,711 and the Scott et al. U.S. Pat. No. 4,398,184. A magnetic motion detector and corresponding circuitry are set forth in U.S. Pat. No. 4,584,569. Further infrared intrusion detectors and alarm systems are described in U.S. Pat. Nos. 4,570,157 and 4,179,691.

While some of these patents describe portable intrusion monitoring alarm systems, the systems are primarily intended for initiating local audible and visible alarms only. None of the references describe a portable intrusion detection and warning system which incorporates a local controller and communications microprocessor or modem and related elements capable of initiating silent transmission of alarm signals or warning signals over selected telephone lines to a remote location. Nor do the references provide a self-contained unit incorporating interacting backup arrangements within an inconspicuous housing or carrying case for example in the configuration of a briefcase with elements operable when the briefcase type carrying case is closed and locked.

OBJECTS OF THE INVENTION

It is therefore an object of the present invention to provide a new portable intrusion detection, surveillance, monitoring and warning system capable of detecting intrusion for example by sensing heat or motion in a monitored space and providing silent warning signals over selectively dialed telephone lines.

Another object of the invention is to provide a portable intrusion detection warning system which is self-contained with the operative elements housed in an inconspicuous carrying case in the configuration of a briefcase concealing the elements and purpose of the system.

A further object of the invention is to provide an unobtrusive portable surveillance alarm system with elements enclosed in a carrying briefcase and operable with the briefcase closed and locked.

DISCLOSURE OF THE INVENTION

In order to accomplish these results the present invention provides a portable alarm system housed in a portable carrying case in the configuration of a briefcase with handle and carrying case enclosure elements hinged on one side and fitted with complementary latch elements and lock on the other side. A feature and advantage of the briefcase configuration of the invention is that the portable alarm system is housed for convenient portability and inconspicuous placement at a desired location.

Intrusion detectors are removably and replaceably housed in the carrying case for removal and placement at remote positions in a space to be monitored. The intrusion detectors include intrusion sensors such as infrared motion sensors and radio transmitters for transmitting detection signals to the portable carrying case upon sensing an intrusion into the monitored space for example by changes in infrared radiation. A radio receiver housed in the carrying case receives the detection signals transmitted from the intrusion detectors.

Within the carrying case an electronic controller is operatively coupled to receive the detection signals from the radio receiver and deliver actuating data signals. The controller is provided with a programmable delay circuit for establishing a selected delay interval between receiving a detection signal and delivering an actuating signal. The controller also comprises an arming circuit and key switch in the arming circuit for switching the electronic controller betWeen a nonoperating or disarmed conditioned and an armed condition in which the controller receives the detection signals from the radio receiver and delivers actuating signals after the programmed delay interval. The delay interval affords time to disarm the system in the event of accidental or unintended excitation of the intrusion detector or detectors. A feature and advantage of the invention is that the key switch is fitted on the carrying case for access to the key switch from outside the carrying case when the carrying case is closed and locked.

The invention also provides a digital communicator or communications processor including a digital dialer operatively coupled to the electronic controller for receiving actuating signals and delivering telephone dialing signals. The digital communicator includes a telephone line output and telephone jack mounted on the carrying case for receiving a telephone plug from outside the carrying case when the carrying case is closed and locked. The telephone dialing signals select a telephone line for transmitting coded signals over the selected telephone line.

Power is supplied to the portable alarm system from either of two sources. External power is supplied through a power supply receptacle fitted on the carrying case for receiving a complementary power supply plug or jack from an external power supply source outside the carrying case. The power supply jack and receptacle function as a switch as hereafter described. External power supply lines are coupled between the power supply receptacle and the electronic controller. The electronic controller includes a distribution circuit for delivering low voltage power to the radio receiver and digital communicator. External power may be supplied by a portable transformer and power supply plug or jack removably carried in the carrying case for plugging the transformer into an external AC line power source, stepping down the voltage of the external power, and providing low voltage power through the power supply jack inserted into the power supply receptacle of the carrying case when the carrying case is closed and locked.

A standby internal power supply is also provided in the form of a standby battery and standby power supply lines operatively coupled between the standby battery, the controller, and the power supply receptacle. According to the invention, the standby circuit is arranged for delivering internal standby power when the external power supply is interrupted.

The portable alarm system is therefore operable by means of the key switch, power supply receptacle, and telephone jack all accessible from outside the carrying case with the intrusion detectors placed at remote positions. A feature and advantage of this arrangement of the invention is that the portable alarm system is operable with the carrying case locked in a closed and inconspicuous position.

Typically, the radio receiver has at least two channels for receiving detection signals on at least two frequencies corresponding to different intrusion detectors or different monitored space zones. The controller and digital communicator likewise have at least two circuit channels for distinguishing between monitored space zones. The digital communicator is programmable to transmit different coded digital signals corresponding to the different respective channels for distinguishing the detectors, zones or channels over the selected telephone line.

According to the preferred embodiment the power supply receptacle is a four pin or four prong receiver. The external power supply lines are coupled between the electronic controller and the first and second pin or prong receivers for delivering external power to the controller. The standby power supply lines are coupled in a circuit between the battery, the electronic controller and the third and fourth pin or prong receivers. A four pin power supply plug or four pin jack with screw in locking collar is provided for insertion in the power supply receptacle. An electrically conducting strap, bridge or jumper is coupled between the third and fourth pins so that the standby power supply circuit may be completed across the third and fourth pins. The circuit is therefore completed through the standby power supply lines, the standby battery and the electronic controller when the four pin power supply jack is inserted in the power supply receptacle. The four pin jack and receptacle modified according to the invention therefore function together as a switch turning on the portable monitoring and warning system with system power, completing the standby power circuit, and initiating trickle charging of the standby battery when the jack and receptacle are coupled.

In the preferred embodiment the invention provides a step down transformer for external power that delivers low voltage, for example, 14 to 16 volts, slightly greater than the voltage of the standby battery, for example 12 volts. In the standby power circuit completed by the four pin jack when inserted in the power supply receptacle, the stepped down AC voltage rectified by the rectifier of the electronic controller, is applied in reverse polarity to the standby battery for trickle charging the battery. In the event of power failure, the standby battery is therefore already in place in a completed standby circuit for delivering low DC voltage to the controller for operating the controller and for distribution of the low DC voltage power to the radio receiver and digital communicator.

The intrusion detectors according to the invention may be for example infrared sensors with radio transmitters. A panic button with radio transmitter is also provided for manual actuation of the transmission of detection signals. A variety of other detectors and sensors may also be used such as photoelectric cells, pressure switches, temperature sensors, touch sensors, etc. for monitoring different problems and different forms of intrusions and providing detection signals, threshold signals, sensing signals, etc. The various operative elements of the portable alarm system are mounted on a deep foam liner which lines the enclosure elements with cut outs or depression receptacle for shock absorbing mounting. Other objects, features and advantages of the invention are apparently in the following specification and accompanying drawings.

DESCRIPTION OF PREFERRED EXAMPLE EMBODIMENTS AND BEST MODE OF THE INVENTION

Figure 1:
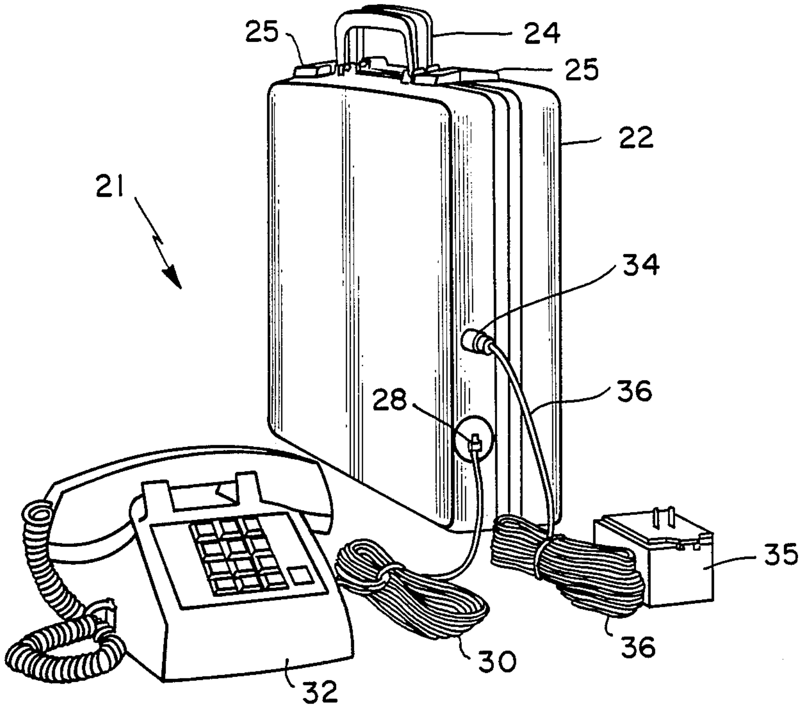
FIG. 1 is a perspective view of the portable intrusion detection warning system enclosed in the briefcase configuration carrying case, with power supply plug, telephone line plug, and key switch for the operative elements accessible from outside the carrying case.

The portable intrusion detection monitoring, warning and alarm system 21 according to the invention is shown in FIG. 1 enclosed within the carrying case 22 in the configuration of a briefcase with handle 24 and latches 25 with locks for latching and locking the carrying case 20 in closed position. Accessible from outside the briefcase carrying case 22 and mounted on the carrying case is the telephone jack receptacle 28 for receiving a telephone chord for example removed from telephone 32 and plugged into the receptacle 28 or a telephone extension chord 30 with standard telephone jacks. Also accessible from outside the briefcase 22 is the external power supply receptacle or coupling 34 for receiving power from an external power supply for example transformer 35 through extension line or extension cord 36. The transformer 35 is adapted for example to plug into the standard AC line power and transform the voltage from 120 volts AC to for example 14 to 16 volts AC.

Figure 2:
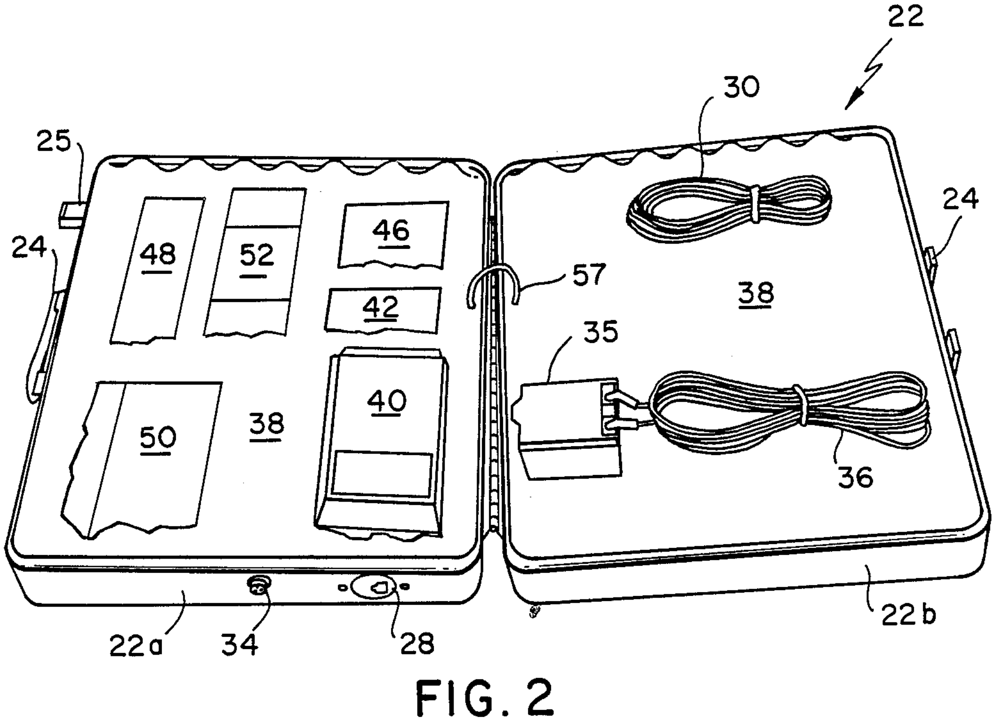
FIG. 2 is a perspective view of the portable intrusion detection warning system with the enclosure elements of the briefcase configuration carrying case in open position and showing the system components.

Referring to FIG. 2, the two halves or enclosure elements 22 and 22*a* of briefcase 22 are lined with deep foam liners 38 formed with cut outs or recesses for shock absorbing mounting of the operative elements of the system inside the carrying case enclosure 22.

Removeably and replaceably mounted in the housing is at least one intrusion detector 40, in this example a passive infrared motion sensor with a radio transmitter. Such a unit containing a Model No. OSM (TM) Infrared Motion Sensor and Model No. 90A40 (TM) Linear Transmitter is manufactured by Colorado Electro-Optics Inc., 2200 Central Avenue, Boulder, Colo. The intrusion detector 40 is removed from the carrying case during operation of the portable warning system and placed in a remote position at a location suitable for monitoring a targeted space, room, enclosure, or region for detecting motion or intrusion by changes in infrared radiation and for transmitting detection signals. The intrusion detector incorporates an FCC required 2 minute delay between transmission of detection signals when activates and the transmitter has a limited range of, for example, 500 to 1000′ (152.5 to 305 m).

Also contained within the carrying case 22 is a removable so-called "panic button" 42 containing a similar linear transmitter with a manual button for manually actuating transmission of detection signals. The linear transmitters of the intrusion detector 40 and panic button 42 may operate on different channels or frequencies for distinguishing the source of the detection signals as hereafter described.

For providing external power to the elements remaining in the briefcase 22 the transformer 35 with standard prongs 44 and extension cord 36 are also removed from the carrying case. The transformer 35 is plugged into a standard AC line voltage wall socket and the plug or jack on extension cord 36 is plugged into the external power receptacle 24 on the carrying case 22 as hereafter described. A telephone line extension cord 30 is also provided for plugging into the telephone receptacle 28 in order to reach a less accessible or distant telephone line.

Detection signals transmitted by the linear transmitters of the intrusion detectors 40 or panic button 42 are received by a radio receiver 46. The radio receiver is a multi-channel linear radio receiver for receiving and distinguishing between detection signals on different frequencies of channels from different intrusion detectors and the panic button. Such a radio receiver having up to eight channels is available from Linear Electronics, Inglewood, Calif., 90301, for example the Linear Alert Receiver Model No. D-2R (TM).

Detection signals received by the radio receiver 46 are transmitted over separate lines representing the different channels to a programmable electronic controller 48 containing electronic circuitry which performs a variety of functions in the portable monitoring and warning system. An electronic controller suitable for use in the present invention is, for example, the Model MC6a Mini Controller manufactured by United Security Products, Inc., Livermore, Calif.

Among the variety of functions performed by the electronic controller 48, controller 48 delivers actuating alarm or warning output signals to a programmable communication microprocessor or digital communicator and digital dialer 50 such as the DD1484 Digital Micro-Communicator (TM) manufactured by NAPCO Security Systems, Inc., 6 Ditomas Court, Copiague, N.Y. 11726. The communications microprocessor and digital dialer 50 transmits digital signals over a telephone line coupled to the standard RJ31X telephone cord phone jack coupled to telephone receptacle 28. Digital dialer 50 is programmable for sending dial tone signals over the telephone line for capturing a selected telephone line and is also programmable for sending coded digital signals over the captured line. Where multiple channels are used for monitoring multiple spaces, the communication microprocessor 50 is programmable for sending different coded signals according to the zone or monitored space in which the intrusion was detected and corresponding intrusion detector.

Also housed in the carrying case 22 of the portable monitoring and warning system 21 is a battery power pack 52 power supply which provides an internal standby battery power supply for the system components. The battery is a rechargeable battery such as a 12-volt gel cell which is recharged by trickle charging from the electronic controller 48. The electronic controller 48 receives stepped down voltage current from transformer 35, stepped down for example from 120 volts AC line voltage to 14–16 volts AC. The electronic controller 48 includes a built-in rectifier for converting the AC input of, for example, 14–16 volts AC to corresponding DC voltage for trickle charging the standby battery 52 as hereafter described.

Figure 3:
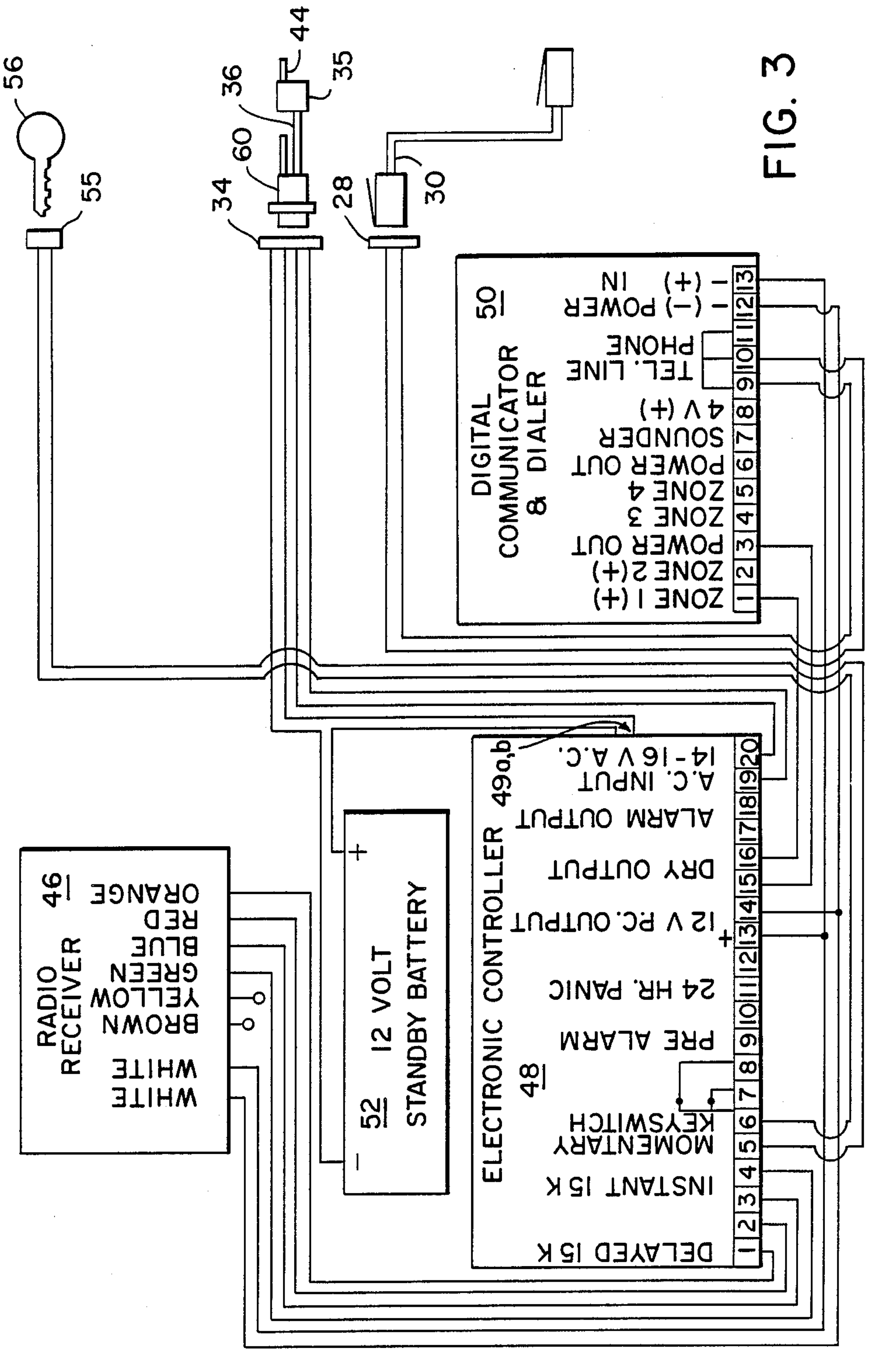
FIG. 3 is a schematic diagram of the operative elements of the portable intrusion detection warning system.

The electrical coupling of the portable warning system components housed in the carrying case 22 and the operation of the system are described with reference to the schematic block diagram of FIG. 3. The terminals of the United Security Products, Inc. Model MC6a Mini Controller used for the electronic controller 48 along with the corresponding electronic functions performed by the Model MC6a are also summarized in Table 1. Only some of the available functions are utilized according to the example embodiment of the invention as hereafter described.

TABLE 1

| Electronic Controller Terminals | |
|---|---|
| Terminal Number | Function |
| 1 | Delayed Detection Signal |
| 2 | |
| 3 | Instant Detection Signal |
| 4 | |
| 5 | Momentary Key Switch |
| 6 | |
| 7 | Ready to Arm Loop LED |
| 8 | Armed Loop LED |
| 9 | Pre Alarm |
| 10 | |
| 11 | 24 Hour Panic Circuit |
| 12 | |
| 13 | 12 VDC Output |
| 14 | |
| 15 | Dry Output |
| 16 | |
| 17 | Alarm Output |
| 18 | |
| 19 | AC Input 14 to 16 VAC |
| 20 | |
| 49a | Trickle Charge/Standby Circuit |
| 49b | |

Among the electronic circuit functions of the electronic controller 48 is an arming circuit at terminals 6, 7, and 8 including an armed loop with red light emitting diode (LED) between terminals 6 and 8 indicating that the system is armed and a ready-to-arm loop with green LED between terminals 6 and 7 indicating that the system is ready to arm. The LED's are visible through the controller housing by holes formed in the housing. The arming circuit and in particular the ready-to-arm loop and green LED are actuated when the system and power are turned on. The system is armed by means of a momentary key switch 55 housed on the side of the briefcase configuration carrying case 22 so that it is accessible from outside the carrying case by a key 56. The key switch 55 is on the opposite side of the briefcase enclosure 22 from the telephone and power receptacles 28 and 34 and is therefore not visible in FIGS. 1 and 2 except for lead wire 57 while being shown in the schematic drawing of FIG. 3. When the system is turned on as hereafter described and the green LED is on in the ready-to-arm loop between terminals 6 and 7, turning the key 56 in momentary key switch 55 arms the system, the green LED turns off and the red LED in the armed loop between terminals 6 and 8 turns on.

When the system is armed, the electronic controller 48 is ready to receive detection signals from the radio receiver 46 transmitted by either the radio transmitter or panic button 42 or the radio transmitter of one of the infrared motion detectors 40. In this example the electronic controller 48 distinguishes between two channels, in this instance a first channel coupled to terminals 1 and 2 through an internal delay loop and a second channel coupled to terminals 3 and 4 without an internal delay.

By way of example, detection signals received by receiver 46 from the infrared motion sensor intrusion detector 40 pass through terminals 1 and 2 subject to a programmable delay, for example a thirty-second delay permitting time to disarm the electronic controller 48 by means of the momentary key switch 55 in the event of accidental or unintended excitation of the infrared motion detector. If the momentary key switch 55 is turned by key 56 when the electronic controller is armed and the red LED in the armed loop between terminals 6 and 8 is on, then the electronic controller is disarmed and the green light in the ready-to-arm loop between terminals 6 and 7 turns on. In the disarmed condition the electronic controller 48 will not respond to detection signals from the radio receiver 46.

The second channel is coupled on lines from the radio receiver 46 to terminals 3 and 4, for example the channel corresponding to signals received from the panic button 42. Because the panic button would be actuated only intentionally, a programmed delay is not included and the electronic controller, when armed, responds instantly to detection signals received at terminals 3 and 4.

Various functions of the electronic controller corresponding for example to terminals 9–12 and 17–18 are not utilized. AC power input of for example 14–16 volts AC received from the transformer 25 is coupled on lines from the external power supply jack 34 to terminals 19 and 20 of the electronic controller. A built-in rectifier delivers 12 volts DC output at terminals 13 and 14 of controller 48 for powering the radio receiver 46 and the communication microprocessor and digital dialer 50. A 12-volt trickle charging circuit output on the side of the controller 48 is also coupled to the 12-volt standby battery 52 in the standby battery power circuit for trickle charging the battery, as hereafter described.

Upon receipt of detection signals by controller 48 on either terminals 1 and 2 subject to the programmed delay of, for example, thirty seconds, or terminals 3 and 4 without the delay, the controller 48 passes data signals or actuating signals from the data output terminals 15 and 16 to the communications processor 50. While only one zone of the four zone receivers on terminals 1, 2, 4, and 5 of the communications processor 50 is utilized in the example of FIG. 3, up to four zones may be utilized for sending signals corresponding to four different locations or spaces monitored by intrusion detectors or panic buttons. The terminal numbering of the communication processor 50 of FIG. 3 are the terminals corresponding to the NAPCO Security Systems Inc. Model DD1484 Digital Micro Communicator (TM).

The communication processor and digital dialer 50 is programmable for sending a dial tone over telephone line output terminals 9 and 10 through telephone jack receptacle 28 which corresponds for example to a standard RJ31X telephone jack. The communication processor and digital dialer 50 is programmable for transmitting different coded signals over the telephone line to a dialed central station receiver or central monitoring station. The coded signals correspond to the different monitored zones. Upon receipt of the coded messages, the central station returns a received signal or close signal to the communication processor 50 over the same telephone line indicating that the coded messages were received. If the initial dial tone signals sent by processor 50 encounter a busy line, backup dial tone signals may be transmitted to capture a backup line or alternative line and the digital dialer 50 switches back and forth until the dial tone signals are received and a telephone line is captured for sending the coded signals.

Figure 4:
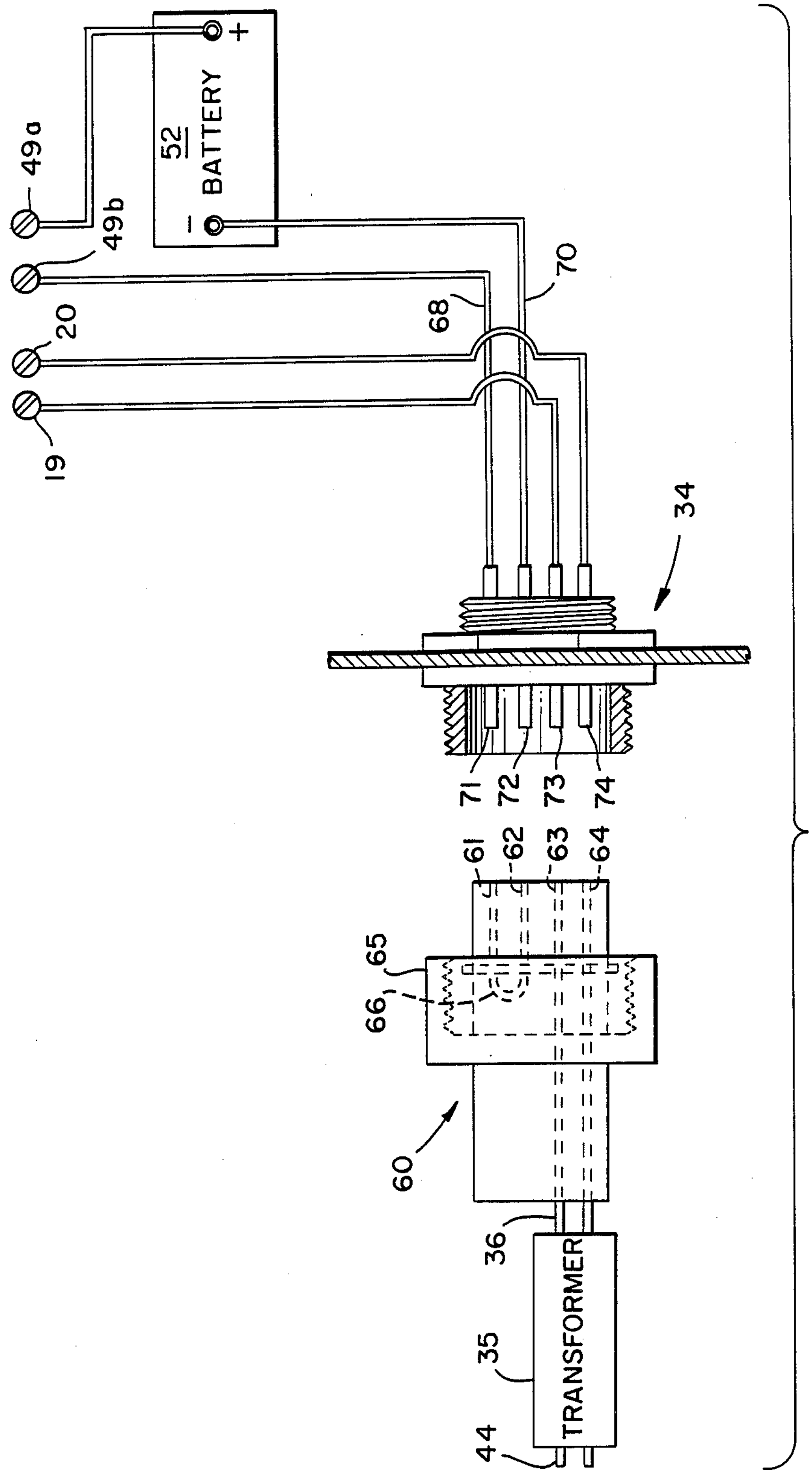
FIG. 4 is a detailed schematic diagram of the external power supply four pin jack and receptacle operative as a switch for the system.

In the preferred example embodiment, the step-down transformer 35 with extension cord 3 is provided with an external power supply plug or jack 60 of special design. As shown in more detail in the diagram of FIG. 4, the external power supply plug or coupling 60 is a pin jack with four pins 61, 62, 63, and 64 and a screw-in locking collar 65. According to the example embodiment of the invention a jumper or conducting strap 66 is coupled across the pins 61 and 62 which couple to the standby battery circuit lines 68 and 70 through the complementary pin receiver 34. The telephone jack receiver 34 mounted on the side of the carrying case 22 has four pin receivers 71, 72, 73 and 74 complementary with the pins 61, 62, 63, and 64. Pins 63 and 64 through receivers 73 and 74 deliver the stepped down low AC voltage, for example 14 to 16 VZC to the terminals 19 and 20 of controller 48. The pins 61 and 62 and conducting strap or jumper 66 function as a switch completing the circuit to the negative terminal of standby battery 52 on line 70. The positive side of the battery 52 is coupled to one terminal **49*a* of the trickle charging circuit of controller 38 while the other terminal 49*b* returns to the shorted pins 61 and 62 through corresponding pin receivers 72 and 73 on circuit line 68**.

A feature and advantage of this arrangement is that the external power supply plug 60 functions as a switch to turn on the system components, actuating the ready-to-arm loop and trickle charging the battery 52. The alternating current voltage delivered by transformer 35 in the range of 14–16 volts AC is rectified in the rectifier and trickle charging circuit of controller 48 delivering DC voltage of reverse polarity slightly in excess of the DC voltage of 12-volt battery 52 for trickle charging when the four-pin jack 60 with screw-in locking collar 65 is coupled to the pin receiver coupling 34. Upon failure of the power, the standby battery 52 immediately takes over powering the components of the circuit with the internal standby power supply. A feature and advantage of this arrangement is that the internal power supply afforded by standby battery 52 is already in place in the standby power circuit and automatically assures continued operation of the system despite loss of external AC power. The conducting strap, jumper, or bridge 66 across pins 61 and 62 of the pin jack switch 60 assures the standby power by functioning as the "switch" completing the standby power circuit.

While the invention has been described with reference to particular embodiments for motion and intrusion detection and infrared detection, monitoring and warning, it may also be used for a variety of other sensing, monitoring and warning applications and environments. For example the intrusion detector may include photoelectric cells, pressure mats and pressure switches, touch sensors, temperature sensors, smoke and flame sensors. etc. Intrusion detection may also be viewed more broadly to include in addition to human intrusion, the intrusion of environmental parameters such as, for example moisture, humidity, gases, low temperatures or high temperatures, pressures, etc. The present invention may incorporate into the intrusion detector, sensors and detectors commensurate with and appropriate for sensing and detecting the targeted environmental parameter. The intrusion detectors may also incorporate threshold levels for sensing and detecting environmental parameters in excess of or falling below selected thresholds for transmitting detection signals or threshold signals for initiating the warning and signaling sequence according to the invention. The construction and arrangement of the operative components and elements of the invention in an unobstrusive briefcase type carrying case provides a portable intrusion, parameter and threshold detector, monitoring and warning system readily available for rapid deployment in an emergency use in a variety of applications including residences, businesses, temporary office space, motel, hotel and conference rooms, other temporary spaces, automobiles and vehicles, airplane cabins, yatchs, watercraft and boat cabins, etc. While the invention has been described with reference to the example embodiments it is intended to cover all variations and equivalence within the scope of the following claims.

We claim:

1. A portable intrusion detection warning system for silent surveillance of a space to be monitored comprising:

a portable briefcase carrying case comprising carrying case enclosure elements hinged on the side and fitted with complementary latch elements and lock on the other side for latching and locking the carrying case enclosure elements in closed position, said portable briefcase carrying case being in the configuration of a briefcase with handle means for convenient portability and inconspicuous placement at a desired location;

intrustion detection means removably and replaceably housed in the briefcase carrying case for removal and placement at remote positions in a space to be monitored, said intrusion detection means comprising intrusion sensing means and radio transmitter means for transmitting detection signals to the portable carrying case upon sensing an intrusion in the monitored space;

radio receiver means housed in the briefcase carrying case for receiving detection signals transmitted from the intrusion detection means;

electronic controller means housed in the briefcase carrying case and operatively coupled to receive detection signals from the radio receiver and deliver actuating signals, said controller means comprising a programmable delay circuit for establishing a selected delay interval between receiving a detection signal and delivering an actuating signal, said controller means comprising an arming circuit and key switch in the arming circuit for switching the electronic controller means between a nonoperating or disarmed condition and an armed condition in which the controller means receives the detection signals and delivers actuating signals after the programmed delayed interval, said key switch being fitted on the briefcase carrying case for access to the key switch from outside the carrying case when the carrying case is closed and locked;

digital communicator means housed in the briefcase carrying case operatively coupled to the controller means for receiving actuating signals and delivering telephone dialing signals, said communicator means comprising a telephone output line and telephone receptacle mounted on the briefcase carrying case for receiving a telephone jack from outside the carrying case when the carrying case is closed and locked for transmitting telephone dialing signals which select a telephone line and for transmitting digital signals over the selected telephone line;

external power supply means comprising a power supply receptacle fitted on the briefcase carrying case for receiving a complementary power supply plug from an external power supply source outside the carrying case, and external power supply lines housed within the briefcase carrying case and coupled between the receptacle and the controller means, said controller means comprising distribution circuit means for delivering power to the radio receiver means and digital communicator means;

and internal power supply means housed within the briefcase carrying case comprising a standby battery and standby power supply lines operatively coupled between the standby battery and the controller means, said controller means comprising standby power supply circuit means for delivering standby power from the standby battery when the external power supply is interrupted;

said portable alarm system being operable by means of the key switch, power supply receptacle, and telephone receptacle all accessible from outside the briefcase carrying case with the carrying case locked in closed position with the radio receiver means, electronic controller means, digital communicator means, external power supply means, and internal power supply means contained within the briefcase carrying case and with the intrusion detection means placed at remote positions for silent surveillance and warning of detection of intrusion in the space to be monitored.

2. A portable alarm system as set forth in claim 1 wherein the radio receiver means comprises at least two channels for receiving detection signals on at least two frequencies corresponding to different intrusion detection means at different monitored space zones, and wherein the controller means and digital communicator means each comprise at least two circuit channels for distinguishing between monitored spaced zones, said digital communicator being programmable to transmit different coded digital signals corresponding to the respective channels over selected telephone lines.

3. The portable alarm system of claim 2 wherein the intrusion detection means comprises at least two intrusion detectors for placement at remote positions for monitoring different space zones.

4. The portable alarm system of claim 1 wherein the intrusion detection means comprises at least-one infrared sensor and radio transmitter for sensing infrared radiation changes and transmitting detection signals, and at least one panic button means and second radio transmitter for manual actuation to initiate transmission of detection signals.

5. The portable alarm system of claim 1 wherein the power supply receptacle comprises a four pin receiver, wherein the external power supply lines are coupled between the electronic controller means and the first and second pin receivers for delivering external power to the controller means, and wherein the standby power supply lines are coupled in a circuit between the battery, controller means and the third and fourth pin receivers, said portable alarm system comprising a four pin power supply plug for insertion in the power supply receptacle and electrical jumper or strap means coupled between the third and fourth pins so that the circuit is completed across the third and fourth pins through the standby power supply lines between the standby battery and controller means when the four pin power supply plug is inserted in the power supply receptacle.

6. The portable alarm system of claim 5 wherein the controller means comprises rectifier means coupled to the standby power supply circuit for trickle charging the standby battery when a power supply plug is inserted into the external power supply receptacle.

7. The portable alarm system of claim 1 wherein the key switch comprises a momentary spring return key switch.

8. The portable alarm system of claim 6 further comprising portable transformer means operatively coupled to the four prong power supply plug, said portable transformer means and power supply plug being removably carried in the carrying case for plugging the transformer into an external AC line power source, for stepping down the voltage of the external power, and for plugging the power supply jack into the power supply receptacle of the carrying case when the carrying case is closed and locked.

9. The portable alarm system of claim 1 wherein the carrying case comprises a deep foam liner lining the enclosure elements, said liners being formed with cut out or depression receptacles for receiving and shock absorbing mounting the respective operative elements of the portable alarm system in the carrying case.

10. A portable intrusion detection warning system for silent surveillance of a space to be monitored comprising:

a portable briefcase carrying case comprising carrying case enclosure elements hinged on one side and fitted with complementary latch elements and lock on the other side for latching and locking the carrying case enclosure elements in closed position, said portable briefcase carrying case being in the configuration of a briefcase with handle means for convenient portability and inconspicuous placement at a desired location;

intrusion detection means removably and replaceably housed in the briefcase carrying case for removal and placement at remote positions in a space to be monitored, said intrusion detection means comprising intrusion sensing means and radio transmitter means for transmitting detection signals to the portable briefcase carrying case upon sensing an intrusion in the monitored space;

radio receiver means housed in the briefcase carrying case for receiving detection signals transmitted from the intrusion detection means;

electronic controller means housed in the portable briefcase carrying case and operatively coupled to receive detection signals from the radio receiver means and deliver actuating signals, said controller means comprising an arming circuit and key switch in the arming circuit for switching the electronic controller means between a non-operating or disarmed condition and an armed condition in which the controller means receives the detection signals and delivers the actuating signals, said key switch being fitted on the briefcase carrying case for access to the key switch with a key from outside the carrying case when the carrying case is closed and locked;

digital communicator means housed in the portable briefcase carrying case and operatively coupled to the controller means for receiving actuating signals and delivering telephone dialing signals, said communicator means comprising a telephone output line and telephone receptacle fitted on the briefcase carrying case for receiving a telephone jack from outside the carrying case when the carrying case is closed and locked for transmitting telephone dialing signals which select a telephone line and for transmitting digital signals over the selected telephone line;

power supply means comprising a power supply receptacle fitted on the briefcase carrying case for receiving a complementary power supply plug from an external power supply source outside the carrying case and power supply lines housed within the briefcase carrying case and coupled between the receptacle and the controller means;

said portable alarm system being operable with the intrusion detection means placed at remote positions by means of the key switch, power supply receptacle and telephone jack accessible from outside the carrying case with the briefcase configuration carrying case locked in closed position with the radio receiver means, electronic controller means, digital communicator means, and power supply means contained within the housing and with the intrusion detection means placed at remote positions for silent surveillance and warning of detection of intrusion in the space to be monitored.

11. The system of claim 10 wherein the intrusion detection means comprises at least one infrared sensor and first radio transmitter for sensing infrared radiation changes and transmitting detection signals, and at least one panic button means and second radio transmitter for manual actuation to initiate transmision of detection signals.

12. The system of claim 10 further comprising internal power supply means housed within the briefcase carrying case comprising a standby battery and internal power supply lines operatively coupled between the standby battery and the controller means, said controller means comprising standby circuit means for delivering standby power when the external power supply is interrupted and wherein said power supply receptacle comprises a four pin receiver, wherein the external power supply lines are coupled to the first and second pin receivers for delivering external power to the controller means, and wherein the internal power supply lines are coupled to the third and fourth pin receivers, said portable alarm system comprising a four pin power supply plug for insertion in the power supply receptacle and electrical jumper or strap means coupled between third and fourth pins of the plug corresponding to the third and fourth pin receivers so that a circuit is completed across the third and fourth pins through the internal power supply lines when the four pin power supply plug is inserted in the power supply receptacle.

* * * * *